United States Patent [19]

Jones

[11] 4,263,535

[45] Apr. 21, 1981

[54] MOTOR DRIVE SYSTEM FOR AN ELECTRIC MINING SHOVEL

[75] Inventor: Byron M. Jones, New Berlin, Wis.

[73] Assignee: Bucyrus-Erie Company, Milwaukee, Wis.

[21] Appl. No.: 947,259

[22] Filed: Sep. 29, 1978

[51] Int. Cl.³ .............................................. H02P 3/00
[52] U.S. Cl. ..................................... 318/87; 318/112; 318/254; 318/376
[58] Field of Search ............... 254/190 R; 318/98, 99, 318/34, 432, 433, 254, 376, 49, 50, 112, 86–88; 361/159; 307/32, 38, 11, 39, 31; 363/135

[56] References Cited

U.S. PATENT DOCUMENTS

| | | | |
|---|---|---|---|
| 2,116,420 | 5/1938 | Whiting | 318/432 |
| 3,447,066 | 5/1969 | Heyner et al. | 307/32 X |
| 3,551,775 | 12/1970 | Safiuddin | 318/98 X |
| 3,732,472 | 5/1973 | Farre | 318/432 X |
| 4,061,948 | 12/1977 | Lamparter | 318/87 |
| 4,150,812 | 4/1979 | Baron | 254/190 R |

Primary Examiner—Ulysses Weldon
Attorney, Agent, or Firm—Quarles & Brady

[57] ABSTRACT

A motor drive system for a mining shovel includes three a.c. motors which are driven by associated inverter circuits that receive power from a common d.c. bus. The d.c. bus connects to the a.c. power lines through a disconnect switch and a rectifier circuit and a chopper circuit is employed to dissipate power when the d.c. bus voltage rises due to motor regeneration. A power monitor and control circuit monitors the a.c. line voltage and the d.c. bus voltage and it controls the various system elements in such a manner as to maintain the d.c. bus voltage within an operating range. When the d.c. bus voltage cannot be maintained within the operating range, the disconnect switch is enabled to shut down the machine.

6 Claims, 11 Drawing Figures

MOTOR DRIVE SYSTEM FOR AN ELECTRIC MINING SHOVEL

BACKGROUND OF THE INVENTION

The field of the invention is motor drive systems for large electric mining machines such as shovels and drag lines.

Large mining machines include three separate motor drive systems. In a shovel, for example, a first motor drive serves to hoist and lower a dipper which is fastened to the end of a handle, a second motor drive serves to crowd and retract the handle with respect to a boom, and a third motor drive serves to swing a revolving frame which supports the boom. In large shovels such as those disclosed in U.S. Pat. Nos. 3,690,483; 3,708,152; 3,901,341 and 4,053,139, Ward-Leonard drive systems have almost always been employed. Such drive systems include control circuits exemplified by that disclosed in U.S. Pat. No. 3,518,448 issued to D. E. Barber on June 30, 1970 and entitled "Control System for Excavating Equipment."

Ward-Leonard drive systems for mining machines include a large a.c. induction motor which drives a d.c. generator and the d.c. generator in turn provides electrical power to a d.c. motor. The d.c. motor drives the hoist, crowd retract or swing drive mechanisms of the mining machine and its torque and/or speed is typically controlled through a field winding associated with the d.c. generator as illustrated in U.S. Pat. Nos. 3,806,780 and 4,031,440. The size, weight and cost of a drive system having three rotating machines in the two hundred to one thousand horse power range is enormous and it has long been an objective in the field to employ a single a.c. or d.c. motor in place of the conventional Ward-Leonard system.

The use of an a.c. induction motor to drive the various mining machine motions is particularly attractive because they do not have commutating brushes which must be maintained and periodically replaced. To control the speed of an a.c. induction motor, however, the frequency and level of the applied voltage must be varied and this necessitates the use of inverter circuits which employ solid state devices such as silicon control rectifiers. Although such "static" a.c. motor drives have found numerous applications in other fields, their application to mining machines present a number of unique problems.

One such problem is the energy which is regenerated by the a.c. motor during certain portions of the digging cycle. For example, when the dipper is lowered the hoist motor regenerates energy through the inverter. If this energy is not dissipated, the voltage across the direct current supply for the inverter can rise to destructive magnitudes. In prior Ward-Leonard drive systems such regeneration presented no problem because the energy was simply regenerated onto the power lines.

Another difficulty with electric mining shovels of all types is the frequent power outages which occur at mining sites. Typically, mines are located in remote areas and power lines must be extended over long distances. Momentary power outages of less than one or two seconds are quite common and it is neither necessary nor desirable to shut down the mining machine when such momentary outages occur. On the other hand, excessive currents and resulting overheating of the drive motor can occur if it is allowed to operate for a prolonged period with reduced voltage. In prior Ward-Leonard drive systems, the kinetic energy stored in the rotating machines was often sufficient to maintain voltages at the required levels during momentary power outages and voltage sensitive disconnect switches were employed to sense a prolonged reduction in applied line voltage. Although capacitors can be employed in small static a.c. motor drives to store energy, the size and cost of such capacitors is prohibitive when applied to a large mining machine and other means must thus be employed to ride through momentary power outages.

SUMMARY OF THE INVENTION

The present invention relates to an a.c. motor drive system for a mining machine, and particularly to a system in which each a.c. drive motor is coupled to a common d.c. bus by an associated inverter circuit and the d.c. bus is coupled to the a.c. power lines by a rectifier circuit. Disconnect means is connected between the power lines and the rectifier circuit and it is operable in response to a disable signal to shut down the system by disconnecting it from the power lines. A power monitor and control circuit operates the disconnect means and it includes voltage sensing means for monitoring a.c. line voltage, comparator means for generating a logic signal when the a.c. line voltage drops below a certain level, a timer which generates a disable signal to the disconnect means when the a.c. line voltage remains low for a predetermined time interval, and means connected to the d.c. bus and the inverter circuits for reducing the power delivered to the drive motors when the d.c. bus voltage drops below a preselected level.

When a power outage occurs the power monitor and control circuit operates the inverter circuits in such a manner that minimal or no power is taken from the d.c. bus. The d.c. bus voltage may thus be maintained until power is restored. When the timer times out, however, power failure is presumed and the machine is shut down.

Because power may not be drawn from the d.c. bus during a power outage the drive motors may come to a halt before the timer times out. This may give the operator the impression that the machine has shut down when in fact it has not. To insure that the machine does not start unattended, the power monitor and control circuit also includes a second timer which is initiated when all drive motors come to a halt. This second timer times out in a relatively short time (for example, one second) to operate the disconnect means. It is not possible during this short time period for the operator to leave the machine unattended and yet it does allow further time for the system to recover before being shut down.

The power monitor and control circuit also protects against situations which create overvoltage on the d.c. bus. More particularly it includes means for reducing the regeneration of power through the inverter circuits to the d.c. bus when the d.c. bus voltage reaches a preselected level.

Also, the system includes a chopper circuit which connects to the d.c. bus and which dissipates energy when enabled. The power monitor and control circuit enables this chopper circuit when the d.c. bus voltage rises above a certain level, and under normal operating conditions, the d.c. bus voltage remains at this level.

If these measures for holding down the d.c. bus voltage are not effective, the power monitor and control circuit also includes means for operating the disconnect means to shut down the machine when the d.c. bus voltage rises above another preselected level.

DESCRIPTION OF THE PREFERRED EMBODIMENT

Figure 1:
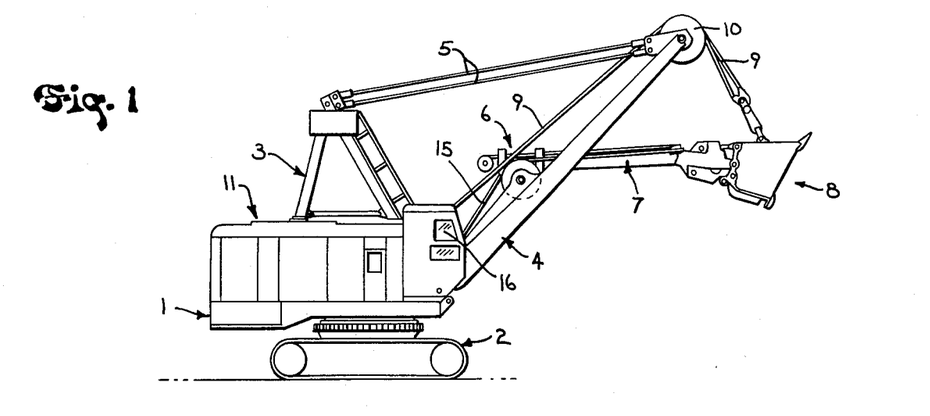
FIG. 1 is an elevation view of an electric mining shovel which employs the present invention.

Referring particularly to FIG. 1, an electric mining shovel has a revolving frame 1 which is rotatably mounted to a lower frame 2 that includes a set of crawlers. The revolving frame 1 supports an A-frame structure 3 and a boom 4. The lower end of the boom 4 is pivotally attached to the revolving frame 1 and its upper, or outer end, is connected to the apex of the A-frame 3 by boom stays 5. A saddle block 6 is mounted to the boom 4 intermediate its ends and the inner end of a dipper handle 7 is slidably and rotatably received in an opening through the saddle block 6. A dipper 8 is connected to the outer end of the dipper handle 7 and it is supported by a hoist rope 9 which extends over a boom point sheave 10.

Figure 2:
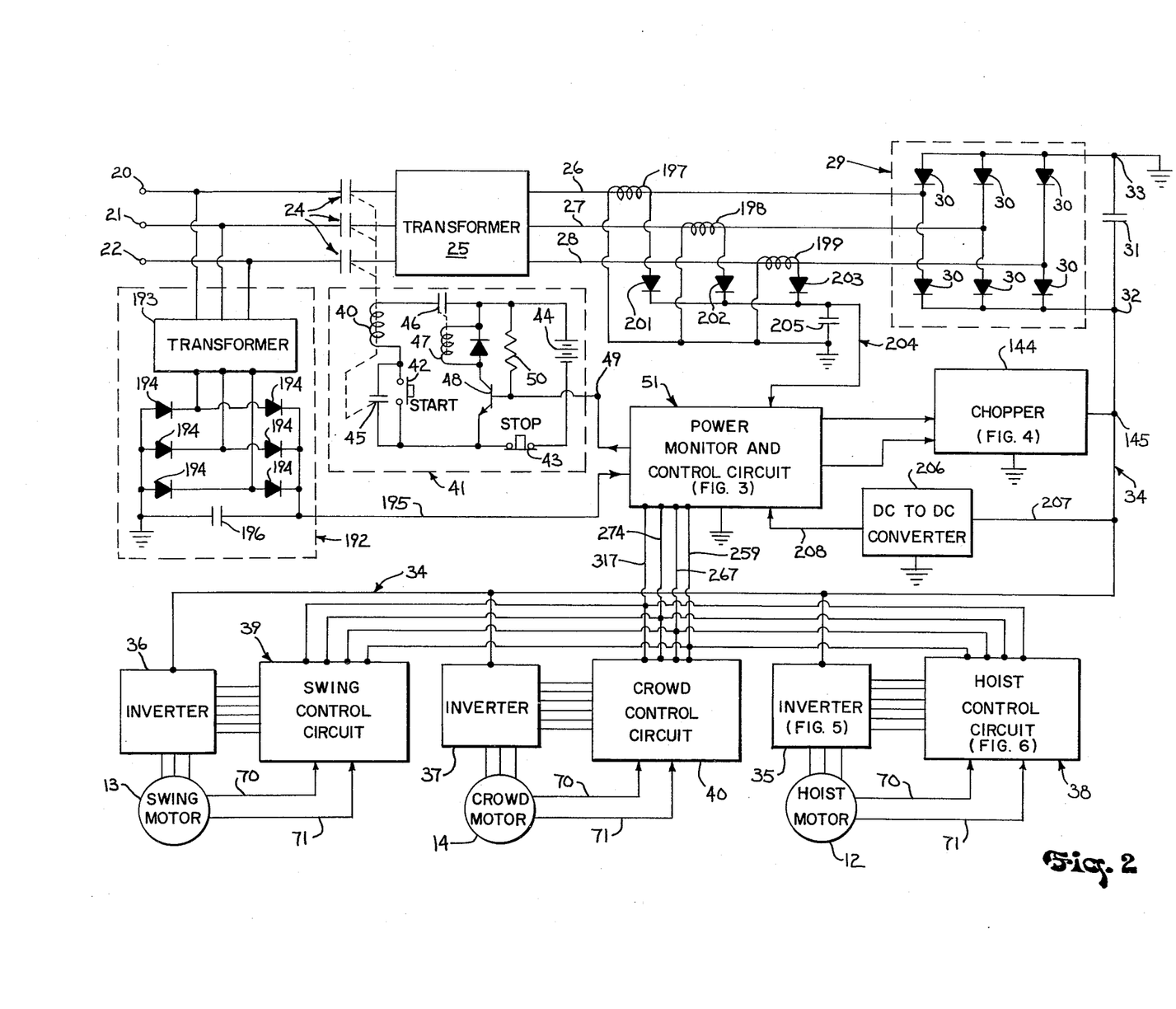
FIG. 2 is an electrical schematic diagram of a motor drive system which employs the present invention.

Referring to FIGS. 1 and 2, three electric motors and their associated drive systems are mounted on the frame 1 within a machinery housing 11. These three motors control the motion of the mining shovel during digging. They include a hoist motor 12 which drives a hoist drum (not shown in the drawings) that attaches to the hoist rope 9, a swing motor 13 which revolves the upper frame 1 to swing the boom 4 and attached dipper 8 from side to side, and a crowd-retract motor 14 which controls the sliding motion of the dipper handle 7 within the saddle block 6 by means of a rope 15. During a normal operating cycle, the dipper 8 is crowded outward into a soil bank, hoisted upward to dig and fill the dipper and then swung to one side and dumped. All of these motions are controlled by an operator positioned in a cab 16 adjacent the boom 4.

All three motors 12, 13 and 14 are a.c. induction motors which receive power from a set of three power lines 20, 21 and 22. The three-phase, 4150 volt 60 cycle power on the lines 20–22 is conveyed through a set of normally open line contacts 24 to the primary winding of an isolation transformer 25. The secondary of the transformer 25 connects through a set of three lines 26–28 to the inputs of a full wave rectifier circuit 29 comprised of six diodes 30. A storage capacitor 31 connects across rectifier circuit output terminals 32 and 33 and the negative output terminal 33 connects to signal ground.

The positive rectifier circuit output terminal 32 connects through a d.c. bus 34 to a first inverter circuit 35 that drives the hoist motor 12, a second inverter circuit 36 which drives the swing motor 13 and a third inverter circuit 37 which drives the crowd motor 14. As will be described in more detail below, each of the inverter circuits 35–37 is connected to an associated control circuit 38, 39 and 40 and each operates to synthesize a three-phase a.c. current for its attached motor from the d.c. power on the bus 34. By controlling the frequency of this synthesized current the speed of the motors 12, 13 and 14 may be controlled, and by controlling the in phase and out of phase levels of the applied current, the torque generated by the respective motors 12, 13 and 14 can be controlled.

Power to the d.c. bus 34 is controlled by the line contacts 24 which are operated by an energizing coil 40. The coil 40 forms part of a master control circuit 41 that includes a normally open start push button switch 42 and a normally closed stop push button switch 43. The switches 42 and 43 are connected in series with the energizing coil 40 across a d.c. power supply indicated at 44. A set of auxiliary contacts 45 are connected in parallel with the start switch 42 and these are also closed when the coil 40 is energized to latch the line contacts 24 closed when the start push button switch 42 is depressed. A second set of normally open contacts 46 are connected in series with the energizing coil 40 and these are operated by a relay coil 47. The relay coil 47 is driven by a transistor 48 which has its base coupled to a power enable line 49.

The switches 42 and 43 of the master control circuit 41 are situated in the operator's cab 16. When the start switch 42 is closed the coil 40 is energized and the line contacts 45 are closed to latch the coil 40 in its energized state. Under normal operating conditions the transistor 48 is held in its conductive state by a resistor 50 which connects between the positive d.c. power supply and its base, and as a result, the relay coil 47 is energized and holds the contacts 46 in their closed state. The line contacts 24 remain closed until the operator depresses the stop push button switch 43 or until a logic low disable signal is applied to the power enable line 49 to switch off the transistor 48. The power enable line 49 is connected to a power monitor and control circuit 51 which will be described hereinafter.

Figure 5:
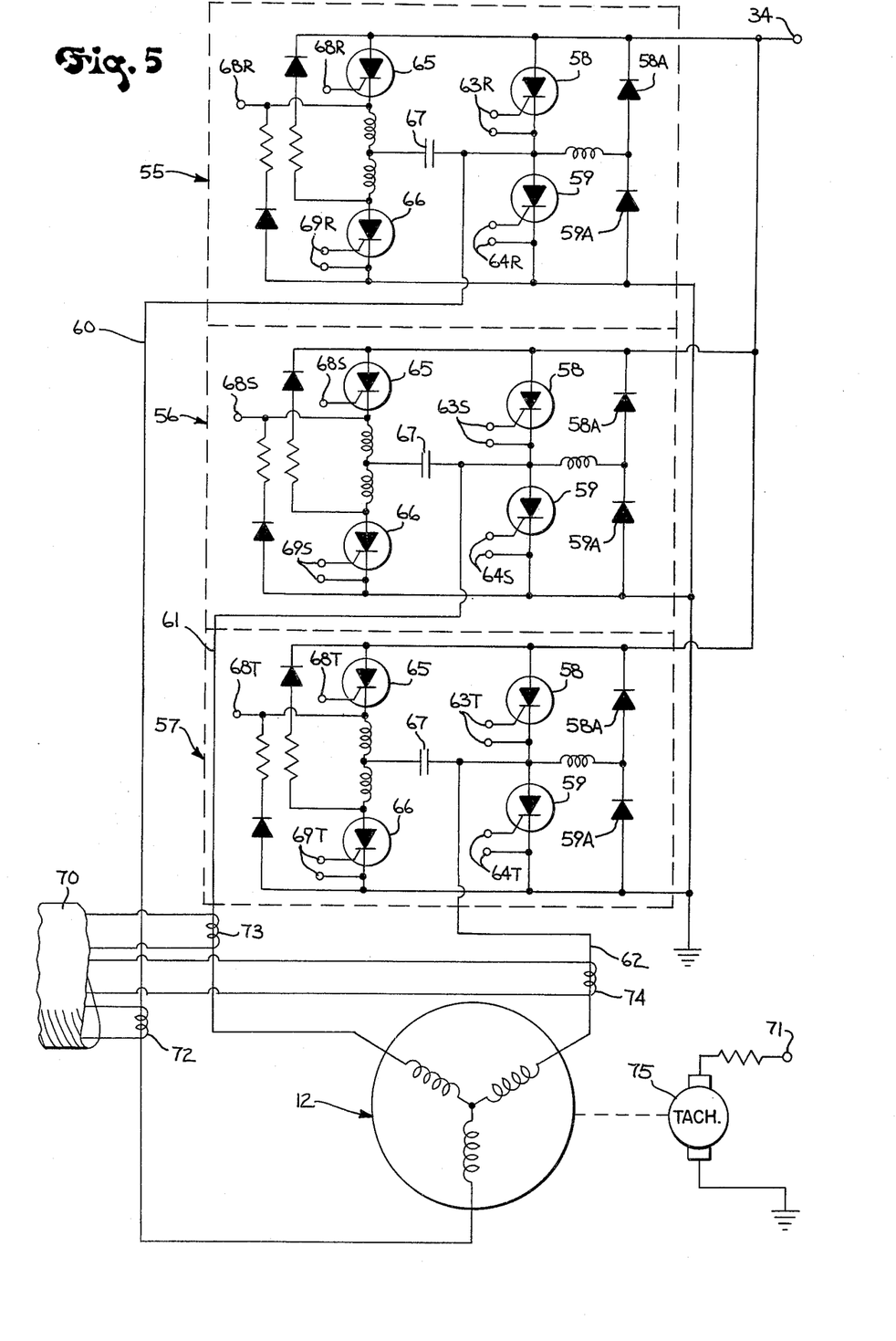
FIG. 5 is an electrical schematic diagram of the hoist motor and inverter which forms part of the system of FIG. 2.

Referring to FIGS. 2 and 5, the inverter circuits 35–37 deliver alternating current of the proper magnitude and frequency to their respective motors 12–14. They are identical three-phase bridge inverter circuits of conventional construction. Each includes an R-phase section 55, and S-phase section 56 and a T-phase section 57. Each section 55–57 includes a pair of series connected main SCRs 58 and 59 which connect between the d.c. bus 34 and signal ground. The junction of the main SCRs 58 and 59 in each of the sections 55–57 are connected through respective lines 60, 61 and 62 to the three stator windings of their associated motor. The main SCR 58 is fired by a positive voltage pulse applied across control terminals 63 and the main SCR 59 is fired by a positive voltage pulse applied across control terminals 64.

The main SCRs 58 and 59 in each inverter section 55–57 are commutated, or turned off, by associated commutating SCRs 65 and 66 which operate in combination with a quenching capacitor 67. The commutating SCRs 65 and 66 are fired by positive voltage pulses applied across control terminals 68 and 69. When thus fired, they connect the quenching capacitor 67 across their associated main SCR 58 or 59 and the charge on the quenching capacitor 67 momentarily reduces the current flow through the main SCR 58 or 59 below the level necessary to maintain conduction ($I_H$). This causes the main SCR 58 or 59 to commutate, or turn off.

By applying appropriate firing pulses to the control terminals 63, 64, 68 and 69 of each inverter section 55-57, the main SCRs 58 and 59 are fired to alternately connect each hoist motor stator winding to the positive and negative terminals of the rectifier circuit 29. For example, a firing pulse is first applied to the control terminals 63 to fire the main SCR 58 and to thereby connect the positive d.c. supply terminal to the motor stator winding. The commutating SCR 65 is then fired to turn off the main SCR 58 and the main SCR 59 is then fired to connect the negative d.c. supply to the same motor stator winding. The main SCR 59 is turned off by firing commutating SCR 66 and the cycle is repeated to alternately switch the motor stator winding between the positive d.c. bus 34 and the negative d.c. supply terminal. Diodes 58A and 59A provide a path for the induced current which results after switching the main SCRs 58 and 59. The switching is controlled to control motor speed and torque.

There are numerous inverter circuits known to those skilled in the art, and the present invention does not relate to the inverter nor is it limited by the particular type which is used. The inverter circuit must, however, be capable of controlling motor speed and motor torque, and it must be capable of controlling the regeneration of power to the d.c. bus 34. A detailed description of such an inverter circuit is provided in U.S. Pat. No. 3,919,624 issued on Nov. 11, 1975 to Hermann Tappeiner.

Referring to FIGS. 2 and 5, the operation of the inverter circuits 35, 36 and 37 are controlled by respective control circuits 38, 39 and 40. Each control circuit 38-40 connects to the SCR control terminals 63, 64, 68 and 69 and each receives motor torque feedback information through a cable 70 and motor speed feedback information through a line 71. The motor torque information is obtained from current transformers 72, 73 and 74 which are connected to the lines 60, 61 and 62 that drive the motor stator windings, and the speed feedback signal is derived from a d.c. tachometer 75 which is mechanically driven by the motor rotor. The tachometer output is generated at an output terminal 71. The polarity of this signal is indicative of motor direction and its magnitude is proportional to motor speed.

Although the control circuit 38 for the hoist motor 12 will now be described in detail, all three control circuits 38, 39 and 40 are essentially the same. The present invention does not relate to the control circuit per se, nor is it limited by the particular control circuit which is described herein.

Figure 6A:
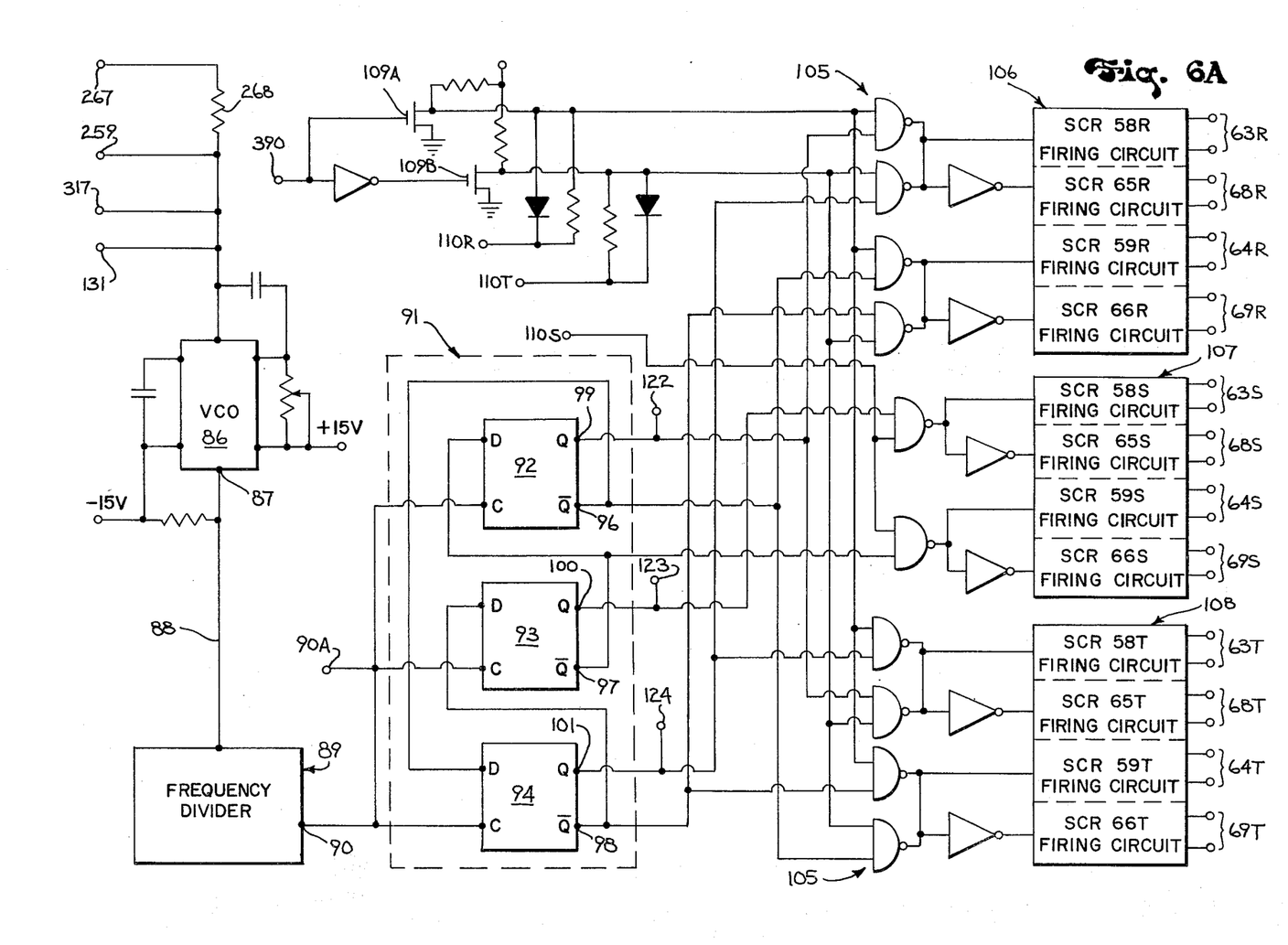
FIGS. 6A, 6B and 6C are electrical schematic diagrams of the hoist control circuit which forms part of the system of FIG. 2.
Figure 6B:
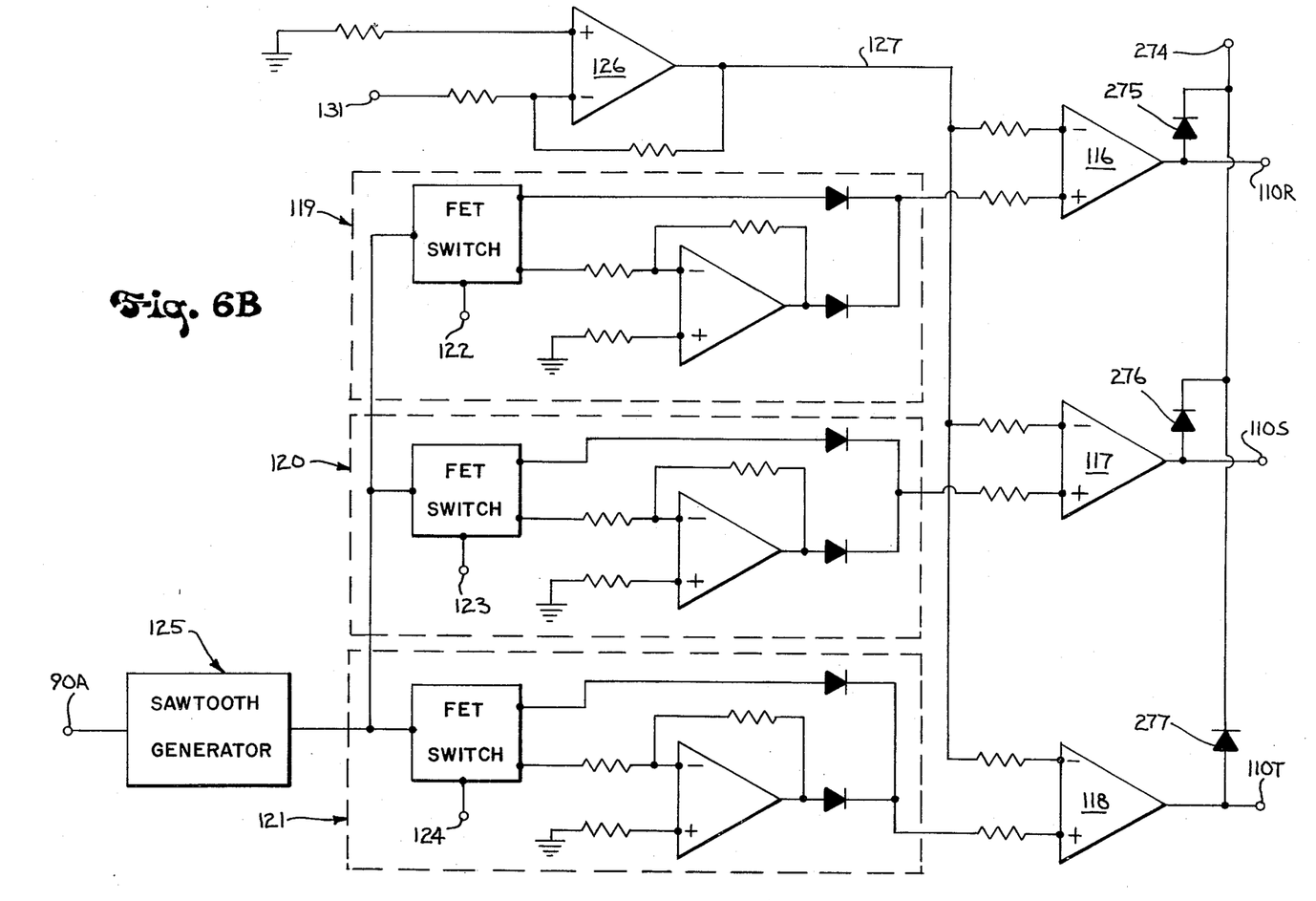
Figure 6C:
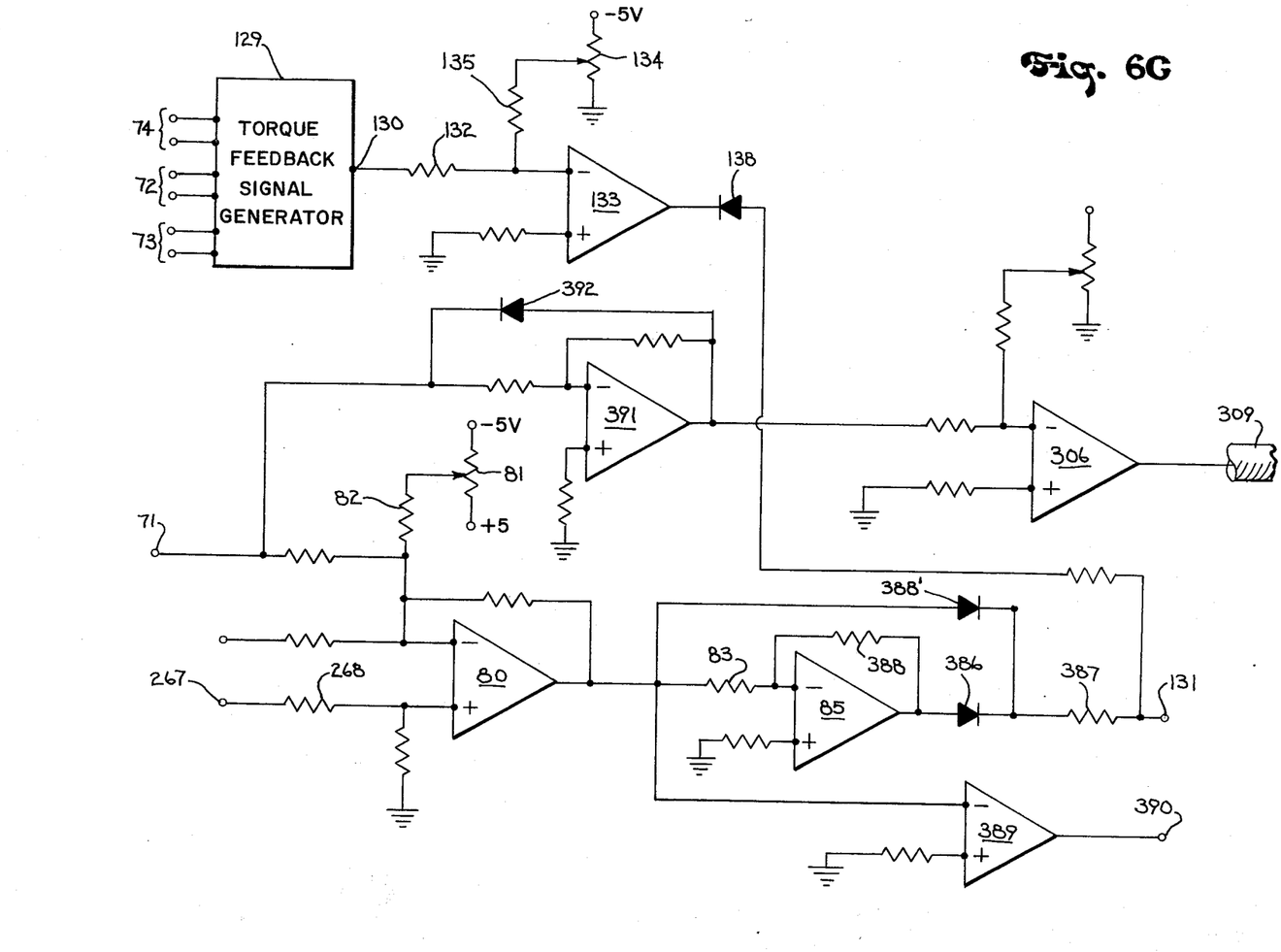

Referring particularly to FIGS. 2 and 6C, the speed feedback signal on the line 71 is received by the control circuit 38 and applied to the inverting input of a summing operational amplifier 80. A speed command signal generated by a potentiometer 81 is also applied to the inverting input of the amplifier 80 through a coupling resistor 82. The speed command potentiometer 81 is located in the operator's cab 16 of the mining shovel and is manually controlled by the operator to control hoist speed and direction. The speed command signal is summed with the speed feedback signal and the resulting signal is inverted and generated at the output of the operational amplifier 80.

The output of the operational amplifier 80 is connected through a coupling resistor 83 to the input of an operational amplifier 85. The output of the operational amplifier 85 is connected through a diode 386 and a resistor 387 to a speed control terminal 131 and a feedback resistor 388 is provided to limit the amplifier gain to one. A second diode 388' connects the amplifier 80 directly to the resistor 387 with the result that a positive speed signal is applied to the speed control terminal 131 regardless of motor direction. The output of amplifier 80 is also coupled to the input of a third operational amplifier 389, and the output of this amplifier provides a signal at terminal 390 which indicates the direction in which the motor is driven.

A torque feedback signal is also coupled to the inverting input of the operational amplifier 80 to provide a limit on the generated motor torque. The torque feedback signal is generated by a torque feedback signal generator 129 which has a set of six inputs connected to the respective current transformers 71, 72 and 73 that are coupled to the motor stator windings. The torque feedback generator 129 generates a positive signal at its output terminal 130 which is proportional to motor torque. The signal is coupled through a resistor 132 to the inverting input terminal of an operational amplifier 133. Numerous circuits are known for generating a torque feedback signal, although one such as that disclosed in U.S. Pat. No. 3,593,083 issued on July 13, 1971 is preferred.

The operational amplifier 133 serves to compare the magnitude of the torque feedback signal with the magnitude of a torque limit signal generated by a potentiometer 134. The potentiometer 134 is connected to a negative d.c. supply terminal and its slider is coupled through a resistor 135 to the inverting input of the operational amplifier 133. Under normal operating conditions the output of the amplifier is positive. When the motor torque exceeds the limit established by potentiometer 134, however, the amplifier output swings negative and this is coupled through the diode 138 to the speed control terminal 131. Motor speed is thus reduced with the result that motor torque drops back below the preselected limit.

Referring particularly to FIG. 6A, the speed control terminal 131 connects to the input of a voltage controlled oscillator 86. The voltage controlled oscillator (VCO) 86 is a commercially available integrated circuit which generates a square wave output signal at an output terminal 87. This output signal varies in frequency between 0 Hertz and 7200 Hertz in proportion to the voltage applied to the VCO input terminal 85. The capacitors and resistors associated with the voltage controlled oscillator 86 function to determine the frequency range over which it operates and to eliminate any possible undesirable oscillations.

The output terminal 87 of the VCO 86 connects to the input 88 of a binary counter which acts as a frequency divider 89. The square wave output signal generated by the VCO 86 is thus divided by a factor of ten to improve frequency stability. The resulting "speed clock signal" is generated at an output terminal 90.

Figure 7:
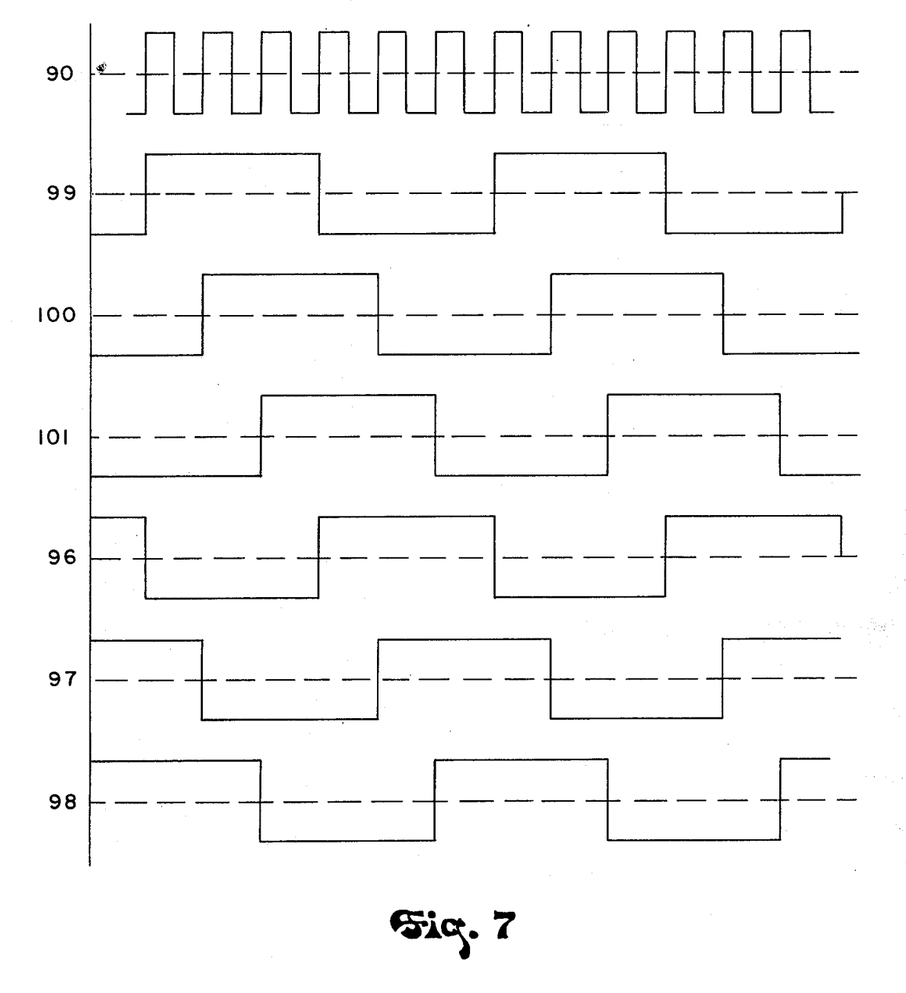
FIG. 7 is a graphic illustration of signals which appear in the control circuit of FIG. 6A.

The speed clock signal is applied to the input of a three-bit ring counter 91 to generate three phase-displaced square wave signals of the same frequency. The ring counter 91 is comprised of three D-type flip-flops 92, 93 and 94 having their clock inputs connected to the frequency divider output terminal 90. The D inputs of the respective flip-flops 92-94 are connected in known manner to the $\overline{Q}$ outputs 96, 97 and 98 on the successive flip-flops to form a ring. As shown in FIG. 7, three phase-displaced square waves are generated at the respective Q output terminals 99, 100 and 101 of the ring counter 91, and the inversions of these square waves are generated at the respective $\overline{Q}$ output terminals 96, 97 and 98. The square waves generated by the flip-flops 92-94 are one-third the frequency of the speed clock signal and they are phase-displaced 120° from one another.

The square wave outputs of the ring counter 91 are coupled through a set of NAND gates indicated generally at 105 to SCR firing circuits that connect to the SCRs in the inverter circuit 35. More particularly, the outputs of the flip-flop 92 connect to drive a set of four SCR firing circuits 106, the outputs of the flip-flop 93 connect to drive four SCR firing circuits 107, and the outputs of the flip-flop 94 connect to drive four SCR firing circuits 108. The SCR circuits 106 drive the R-phase section 55 of the inverter 35, the SCR firing circuits 107 connect to the S-phase section, and the SCR firing circuits 108 connect to the T-phase section 57 as indicated in the drawings.

A pair of field effect transistor switches 109A and 109B are connected to the NAND gates 105 and are driven by the signal on the line 390 to control the connections of the flip-flop 92 and the flip-flop 94. The phase sequence can thus be controlled to drive the motor 12 in either direction. The SCR firing circuits 106-108 are conventional circuits which generate a positive voltage pulse to their associated SCR gate when a positive to negative voltage transition occurs at their input terminal.

A second input on each of the NAND gates 105 are connected to a set of enable terminals 110R, 110S and 110T to provide a means for "modulating" the three phase-displaced waveforms applied to the SCR firing circuits 106-108. More particularly, when the enable terminal 110R is at a logic high voltage the waveforms generated by flip-flop 92 are coupled to the proper firing circuits 106 or 108. When the enable terminal 110S is at a logic high voltage, the SCR firing circuits 107 are enabled, and when the enable terminal 110T is at a logic high voltage the waveforms generated by flip-flop 94 are applied to firing circuits 106 or 107. By controlling the logic state of the enable terminals 110 the waveforms applied to the three-phase induction motor can thus be pulse width modulated. For a more detailed description of the control circuit of FIG. 6A, reference is made to U.S. Pat. No. 4,051,418 issued on Sept. 27, 1977 to O'Berto et al.

Figure 8A:
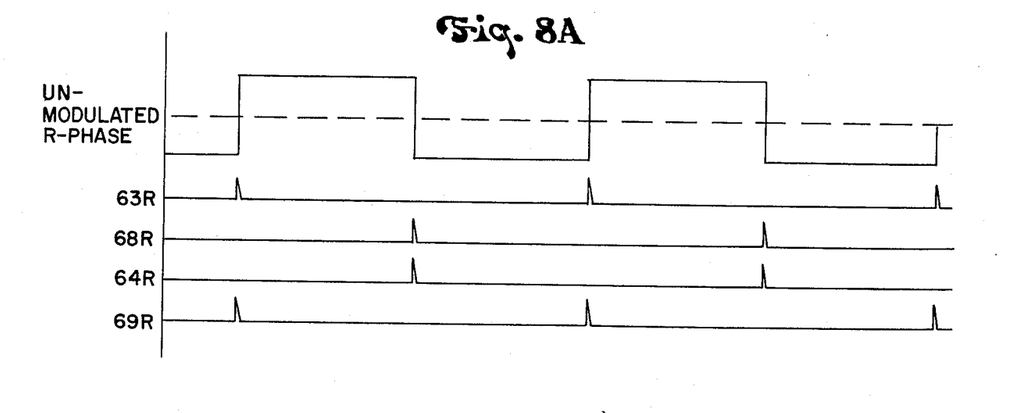
FIGS. 8A and 8B are graphic illustrations of signals which appear in the control circuit of FIGS. 6A, 6B and 6C.

The modulation circuitry is shown in FIG. 6B and this will now be described in connection with the waveforms in FIGS. 8A and 8B. At maximum speed the square waves generated by the ring counter 91 are applied directly to the firing circuits 106-108 without modulation. As a result, the firing pulse occur in the sequence indicated in FIG. 8A and a square voltage waveform, as shown for the R-phase, is applied to the motor stator windings. The S- and T-phases are identically driven, but of course, they are phase-displaced 120°.

Figure 8B:
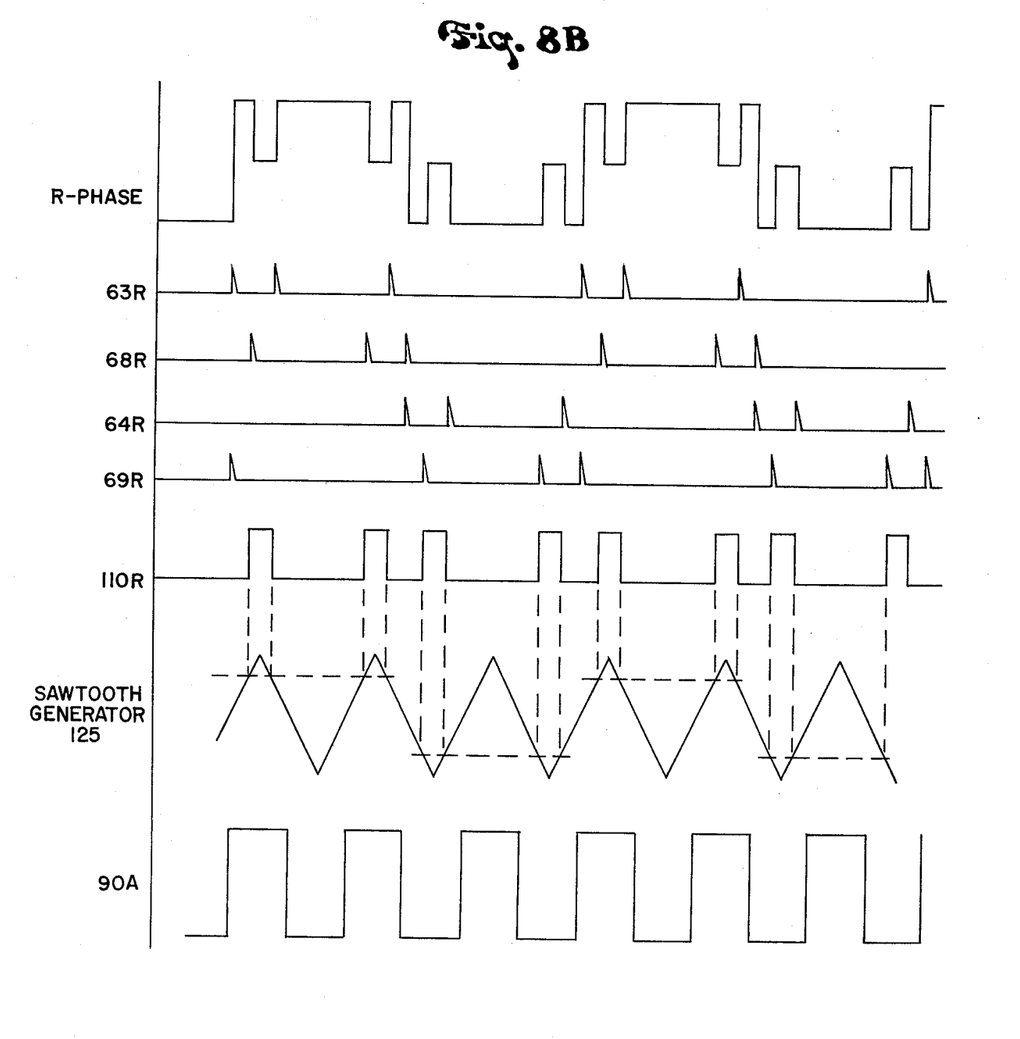

As shown for the R-phase in FIG. 8B, the RMS voltage applied to the motor may be reduced by modulating the voltage waveform applied to its stator winding. This is accomplished by the modulation circuitry of FIG. 6B which disables the NAND gates 105 during portions of each square wave cycle. The SCR firing pulses are thus altered in the manner shown to switch the main SCRs 58 and 59 on and off during each cycle of the unmodulated square wave. The modulated voltage waveform which is thus applied to each motor stator winding produces less flux-producing current and hence, less rotor torque.

Modulation is accomplished by comparing the magnitude of the speed control signal with the magnitude of a reference waveform and enabling the firing circuits 106, 107 and 108 when the reference waveform exceeds the speed control signal. Referring to FIG. 6B, this comparison is made by three operational amplifiers 116, 117 and 118 which have their output terminals connected to the respective enable terminals 110R, 110S and 110T and which have their noninverting input terminals connected to receive reference waveforms from an R-phase reference waveform generator 119, an S-phase reference waveform generator 120 and a T-phase reference waveform generator 121. The R-phase reference waveform generator 119 is connected through a lead 122 to the Q output terminal 99 on the ring counter 91, the S-phase reference waveform generator 120 is connected through a lead 123 to the Q output terminal 122 on the ring counter 91, and the T-phase reference waveform generator 121 is connected through a lead 124 to the Q output terminal 101 on the ring counter 91. Each of the reference waveform generators 119, 120 and 121 is thus synchronized to generate its reference waveform in phase with one of the three phase-displaced square waves.

Each of the reference waveform generators 119-121 is driven by a sawtooth generator 125 which in turn is driven by the frequency divider 89 through a lead 90A. As illustrated in FIG. 8B, the frequency of the sawtooth waveform is three times that of the reference square waves and it is selected peaks of this sawtooth waveform which are applied to the comparators 116-118.

A speed control signal is amplified by an operational amplifier 126 and is applied through a lead 127 to the inverting inputs of the respective operational amplifiers 116, 117 and 118. When the magnitude of the reference phase waveform exceeds the magnitude of this speed control signal, the outputs of the operational amplifiers 116, 117 and 118 are driven to a logic high voltage. The logic high voltage is coupled to the NAND gates 105 by the enable lines 110R, 110S and 110T to fire the inverter SCRs. When the speed control signal decreases in magnitude, the SCRs are fired to remove larger portions of the square waveform applied to each stator winding of the three-phase induction motor and a lower RMS voltage is thus applied. The portion of each square waveform which is applied to the motor stator windings, or in other words, the degree of modulation, is thus directly proportional to the magnitude of the speed control signal on the line 131.

Referring again to FIG. 2, the inverters 35-37 and their associated control circuits 38-40 are three separate but substantially similar motor drive systems which operate off of the common d.c. bus 34. Each of these motor drive systems is responsive to separate operator commands and during digging any number of conditions can exist. For example, all three motors may demand power from the d.c. bus 34 during certain portions of the digging cycle and all three may regenerate power to the d.c. bus 34 during other portions of the digging cycle. More often than not, however, some motors are demanding power while others are regenerating or are idle.

To maintain the d.c. bus voltage substantially constant during all possible working conditions, a chopper circuit 144 is connected to the d.c. bus 34 at the point 145. The chopper circuit 144 operates to dissipate power when the motors 12-14 are regenerating more power than they demand. Without such energy dissipation, the d.c. bus voltage might rise to destructive levels.

Figure 4:
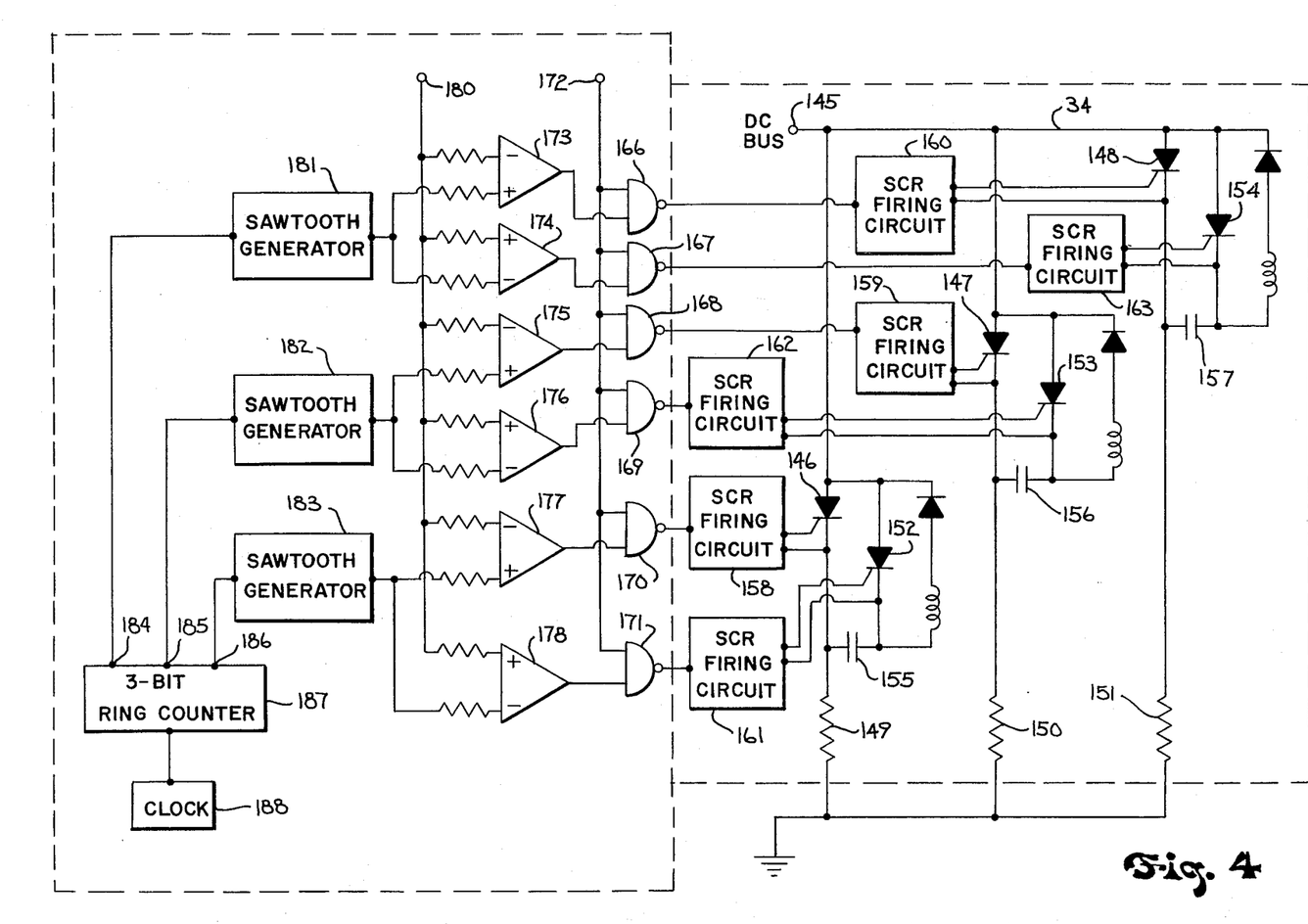
FIG. 4 is an electrical schematic diagram of the chopper which forms part of the system of FIG. 2.

Referring to FIG. 4, the chopper circuit 144 employs three current carrying SCRs 146-148 which are connected in series branches along with respective dissipation resistors 149-151 across the d.c. bus 34. These SCRs 146-148 are fired to conduct current through the resistor 149-151 and to thereby dissipate energy and lower the voltage on the d.c. bus 34.

A "Jones commutation circuit" is associated with each current carrying SCR 146-148 and each of these commutation circuits includes an SCR 152, 153 or 154 and a quenching capacitor 155, 156 or 157. When the commutation SCRs 152-154 are fired, they connect the charged quenching capacitors 155-157 across their associated current carrying SCRs 146-148 with the result that the forward current through the SCRs 146-148 momentarily drops low enough to allow commutation.

The current carrying SCRs 146-148 are controlled by firing circuits 158-160 and the commutating SCRs 152-154 are controlled by firing circuits 161-163. The SCR firing circuits 158-163 are identical to those described above which generate a positive firing pulse when their inputs are driven from a logic high to a logic low voltage level.

The SCR firing circuits 159-163 connect to the respective outputs of NAND gates 166-171. All of the NAND gates 166-171 have one input connected to a chopper enable line 172 and a second input on each is driven by associated operational amplifiers 173-178. All of the operational amplifiers 173-178 have one of their inputs connected through resistors to a chopper control line 180 and the other input on each is connected through a resistor to one of three sawtooth generators 181-183. The sawtooth generators 181-183 are in turn connected to the three Q outputs 184-186 of a 3-bit ring counter 187 which is driven by a 600 Hertz clock 188.

The ring counter 187 is similar to that described above which generates three 120° phase-displaced square waves at its Q outputs 184-186. These square waves are converted to fullwave rectified sawtooth waveforms by the sawtooth generators 181-183 and the magnitudes of these sawtooth waveforms are compared with the magnitude of a chopper control signal on the control line 180. These magnitude comparisons are performed by the operational amplifiers 173-178. When the magnitude of the sawtooth waveforms exceeds the magnitude of the voltage on the control line 180, and the chopper enable line 172 is at a logic high enabling voltage, the current carrying SCRs 148, 147 and 146 are fired to dissipate power in the resistors 149-151. When the magnitude of the sawtooth waveforms drops back below the level of the chopper control signal on the line 180, the output of operational amplifiers 174, 176 and 178 are driven high and the respective commutating SCRs 154, 153 and 152 are fired to turn off the current carrying SCRs 148, 147 and 146. During each cycle of the sawtooth waveform, therefore, each current carrying SCR 146-148 is turned on and off. As the voltage on the control line 180 drops, the on-time of each SCR 146-148 increases, and hence, the amount of power dissipated in the resistors 149-151 increases. Because the sawtooth waveforms are phase-displaced, the SCRs 146-148 conduct current alternately to triple the frequency of any ripple they might produce on the d.c. bus.

There are numerous other chopper circuits known to the art which will operate quite satisfactorily in the present system to dissipate power from the d.c. bus 34 in response to a chopper control signal. The particular circuitry of the chopper circuit disclosed herein does not form part of the present invention.

Figure 3A:
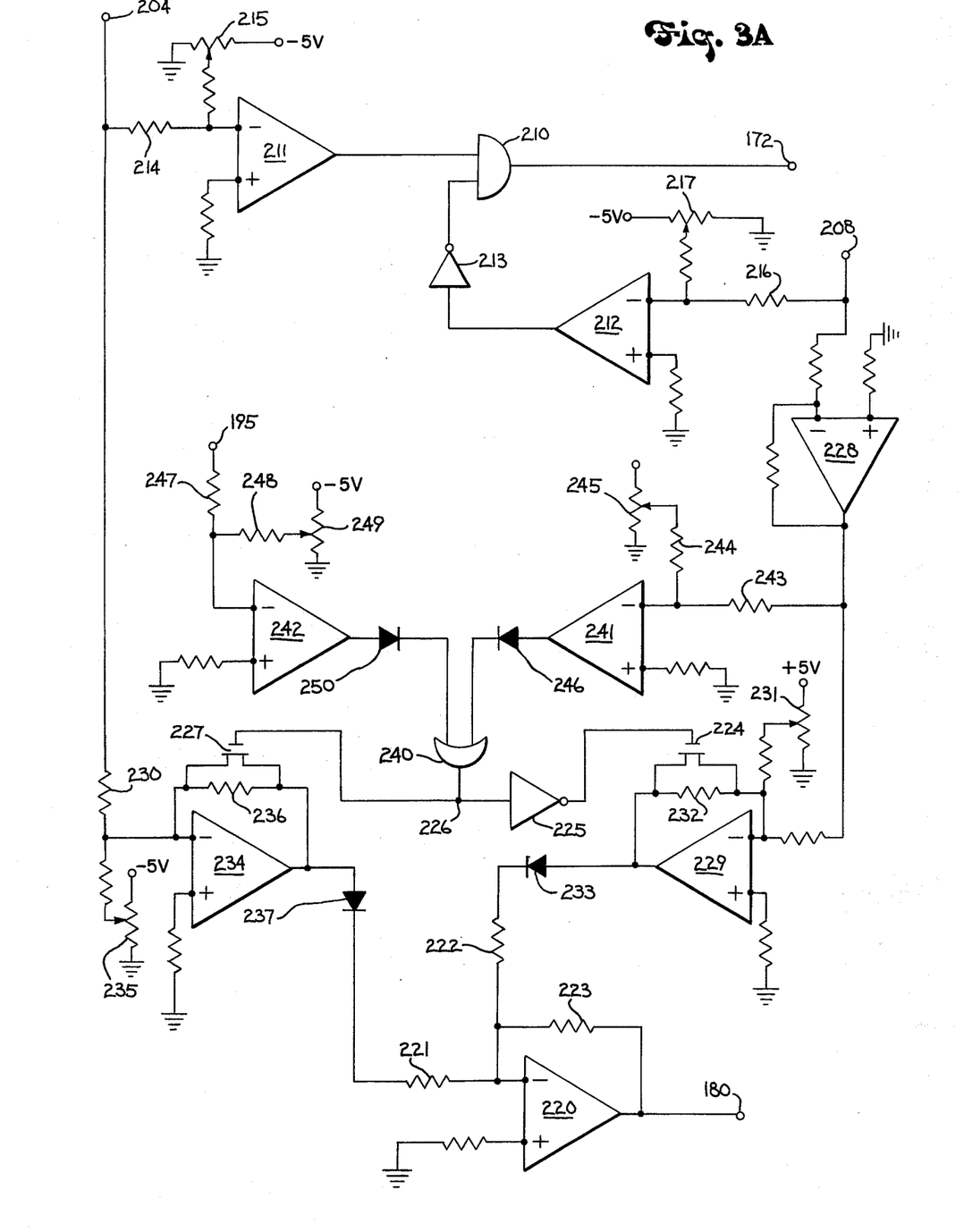
FIGS. 3A and 3B are electrical schematic diagrams of the power monitor and control circuit which forms part of the system of FIG. 2.
Figure 3B:
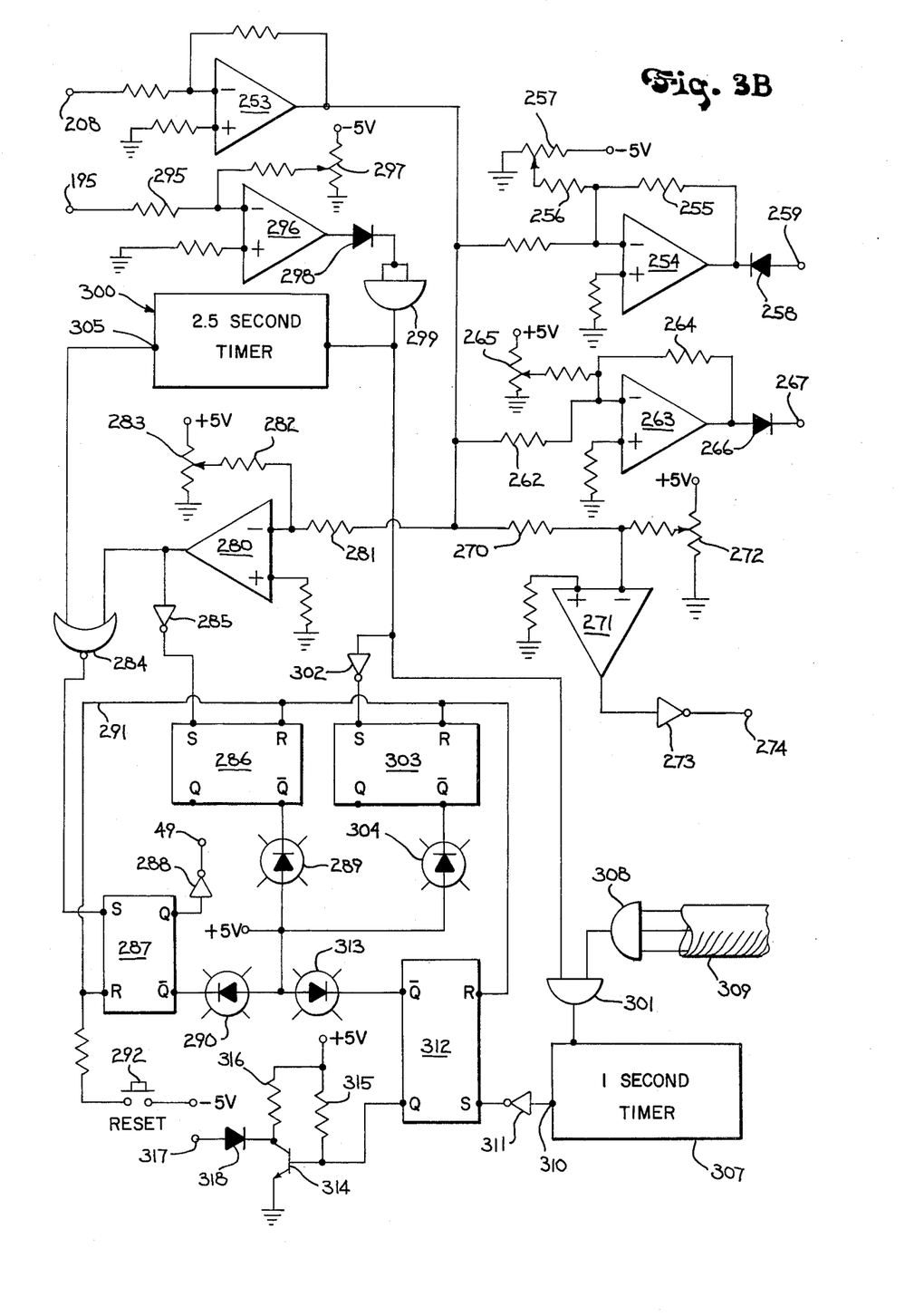

Referring particularly to FIGS. 2 and 3, the power monitor and control circuit 51 monitors the voltage across the power lines 20, 21 and 22, the voltage on the d.c. bus 34, and the current flowing through the lines 26, 27 and 28. In response to variations in these operating parameters from pre-established nominal values, the circuit 51 generates control signals to the above-described system elements. These control signals operate the inverters 35-37 and the chopper circuit 144 in such a manner as to bring these operating parameters back to their nominal values, but if this cannot be accomplished, the power monitor and control circuit 51 opens the line contacts 24 by generating a disable signal through the line 49 to the master control circuit 41 to shut down the machine.

The power monitor and control circuit 51 monitors the level of the applied a.c. voltage by means of a voltage sensing circuit 192 that connects to the power lines 20-22. The circuit 192 includes a three-phase isolation transformer 193 which has its primary winding connected to the respective power lines 20, 21 and 22 and its secondary winding connected to the inputs of a rectifier circuit comprised of six diodes 194. The negative output of the rectifier circuit is connected to signal ground and its positive output is connected through a line 195 to the power monitor and control circuit 51. A filter capacitor 196 connects across the rectifier circuit output terminals to reduce commutation noise on the line 195. The d.c. voltage on the line 195 is an analog signal which is proportional to the value of the line voltage applied to the mining machine. It provides a rapid indication of a power outage.

The circuit 51 monitors the current supplied to the rectifier circuit 29 by means of three current transformers 197-199 which are coupled to the lines 26-28. Each current transformer 197-199 connects to a rectifier diode 201-203 and to signal ground. The cathodes of the rectifier diodes 201-203 are connected together to form a positive d.c. output terminal which connects through a line 204 to the power monitor in control circuit 51. A capacitor 205 is connected between the line 204 and signal ground to filter out any ripple and the resulting d.c. voltage on the line 204 is proportional to the average value of the line current supplied to the system rectifier circuit 29.

The voltage on the d.c. bus 34 is monitored by the circuit 51 through a d.c. to d.c. converter circuit 206. The converter circuit 206 connects to the d.c. bus 34 through a line 207 and it generates a d.c. voltage on a line 208 which is proportional to the d.c. voltage on the bus 34. The converter circuit 206 is of well known construction and its basic function is to provide d.c.

isolation between the bus 34 and the power monitor and control circuit 51.

Referring to FIG. 2, the power monitor and control circuit 51 controls the chopper circuit 144 in response to the signals on the lines 195, 204 and 208. Referring to FIG. 3A, the chopper enable control line 172 is driven by an AND gate 210 which in turn is driven by an operational amplifier 211 and an operational amplifier 212 which is coupled to it through an inverter gate 213. The inverting input of the operational amplifier 211 is coupled through a resistor 214 to monitor the signal on line 204 which indicates line current. This signal is summed at the inverting input with a negative reference signal which is generated by a potentiometer 215. When the line current delivered to the system exceeds 10% of its nominal value, the output of the operational amplifier 211 is driven to a logic low voltage to disable the AND gate 210. When the line current drops below 10% of nominal value, however, the output of the operational amplifier 211 is driven to a logic high voltage which is applied to one input of the AND gate 210.

The inverting input of the operational amplifier 212 is coupled through a resistor 216 to the line 208 that indicates the d.c. bus voltage. The signal generated on the line 208 is summed with a negative reference signal generated by a potentiometer 217 and when the d.c. bus exceeds 105% of its 750 volt nominal value, the output of the operational amplifier 212 is driven from a logic high to a logic low voltage. This signal is inverted by the gate 213 and applied to the second input on the AND gate 210.

The chopper circuit 144 is thus enabled through the control line 172 when the line current drops below 10% of its nominal value and the voltage on the d.c. bus 34 rises above 105% of its nominal value. Otherwise, chopper circuit 144 is disabled and performs no function in the system.

When enabled, the amount of power dissipated by the chopper circuit 144 is controlled by the chopper control signal on the control line 180. This signal is generated by an operational amplifier 220 which has its inverting input connected to a feedback resistor 223 and through coupling resistors 221 and 222 to the outputs of respective operational amplifiers 234 and 229.

The inverting input of the operational amplifier 229 is coupled to the line 208 through an inverting amplifier 228 and its output terminal is connected to a coupling diode 233. A feedback resistor 232 connects to the operational amplifier 229 and a potentiometer 231 is coupled to its inverting input. The potentiometer 231 is adjusted such that the output of the operational amplifier goes positive when the d.c. bus voltage, as indicated by line 208 exceeds 110% of its nominal value.

The output of the other operational amplifier 234 is also connected to a coupling diode 237 and its inverting input is coupled to the line 204 by a resistor 230. A feedback resistor 236 connects to the operational amplifier 234 and a potentiometer 235 is coupled to its inverting input. The potentiometer 235 is adjusted such that the output of the operational amplifier 234 goes positive when the line current, as indicated by line 204, drops below 1% of its nominal value.

The line 180 which controls the chopper circuit 144 is controlled only by one of the operational amplifiers 229 or 234 at any given time. This control is determined by an electronic switch which includes a field effect transistor 224 connected across feedback resistor 232 and a field effect transistor 227 connected across feedback resistor 236. The gate on transistor 227 is connected directly to a control point 226 and the gate on transistor 224 is coupled to the same point by an inverter gate 225. When the control terminal 226 is at a logic low voltage transistor 224 is driven to its conductive, or low impedance, state and transistor 227 is open. As a result, the gain of operational amplifier 229 is reduced to near zero, effectively removing it from the circuit and relinquishing control of the line 180 to the operational amplifier 234. When the control terminal 226 is driven to a logic high voltage, the opposite occurs. That is, operational amplifier 229 becomes effective to drive the chopper control line 180.

Whether the chopper circuit 144 is operated in response to the d.c. bus voltage or in response to the line current is therefore determined by the logic state of the control terminal 226. The control terminal 226 in turn is driven by an OR gate 240 which has one input driven by an operational amplifier 241 and a second input driven by an operational amplifier 242. The inverting input on the operational amplifier 241 is coupled to the output of amplifier 228 through a resistor 243 and its inverting input is coupled through a resistor 244 to receive a positive reference signal generated by a potentiometer 245. The output of the operational amplifier 241 is coupled through a diode 246 and when the voltage on the d.c. bus 34 rises above 107% of its nominal value, the output of the operational amplifier is driven to a logic high voltage which enables the OR gate 240.

The inverting input of the other operational amplifier 242 is connected through a resistor 247 to the line 195. The inverting input is also coupled through a resistor 248 to receive a negative reference signal generated by a potentiometer 249. When the a.c. power source voltage applied to the mining machine is greater than 95% of nominal value (approximately 3950 volts) the output of the operational amplifier 242 is negative and is blocked by a diode 250. When the a.c. line voltage drops below the 95% voltage level, however, the output of the operational amplifier 242 is driven to a logic high voltage and this is applied to enable the OR gate 240.

It should be apparent from the above description that the chopper circuit 144 is operated in response to the amount of line current supplied to the system rectifier 29 until the d.c. bus voltage exceeds 107% of its nominal value or until the a.c. line voltage drops below 95% of its nominal value. When either of these events occur, the electronic switch is operated and the chopper circuit 114 is controlled in response to the voltage on the d.c. bus 34.

Referring particularly to FIG. 3B, the power monitor and control circuit 51 also alters the operation of the inverter circuits 35-37 in response to the voltage level of the d.c. bus 34. More specifically, the line 208 is coupled through an inverting amplifier 253 to the inverting input of an operational amplifier 254 which serves as a means for generating a power reduction signal when the d.c. bus voltage drops below a preselected level. The inverting input of the operational amplifier 254 connects to a feedback resistor 255 and it connects through a resistor 256 to a negative reference signal source which includes a potentiometer 257. The potentiometer is set such that under normal operating conditions the output of the operational amplifier 254 is negative, but when the d.c. bus voltage drops below 80% of its nominal value (approximately 600 volts) the output of the operational amplifier 254 goes negative and generates a power reduction signal through a diode 258 and control line 259 to the inverter control circuits 38, 39 and 40.

Referring to the inverter control circuit diagram in FIG. 6A, the control line 259 is coupled to the input of the voltage controlled oscillator 86. The current generated by the power reduction signal is subtracted from the speed control signal applied to the voltage controlled oscillator, and as a consequence, the inverter SCRs are phased back to conduct less current to the motors 12, 13 and 14. By thus cutting back the power demanded by the motors 12, 13 and 14, the decline in d.c. bus voltage is reduced. Such a decline in bus voltage may occur for example during a momentary loss of a.c. line voltage and it is the purpose of this circuitry to enable the machine to remain "on line" for as long as possible.

Referring again to FIG. 3B, the line 208 which indicates the level of the d.c. bus voltage also couples through the inverting amplifier 253 and a resistor 262 to the inverting input of an amplifier 263. The amplifier 263 serves as a means for generating a regeneration reduction signal when the d.c. bus voltage increases above a preselected level. The inverting input of the amplifier 263 also connects to its output through a feedback resistor 264 and it connects to a positive reference signal source which includes a potentiometer 265. The output of the operational amplifier 263 is coupled through a diode 266 and a control line 267 to each of the inverter control circuits 38, 39 and 40. The potentiometer 265 is set such that the output of the operational amplifier swings positive and generates a regeneration reduction signal when the d.c. bus voltage exceeds 115% of its nominal value.

Referring to the inverter control circuit diagram in FIG. 6A, the control line 267 connects through a resistor 268 to the input of the voltage controlled oscillator 86. The positive regeneration reduction signal tends to increase the voltage applied to the VCO 86 and the rate at which the inverters 35-37 are fired is altered. By thus driving the motors 12-14, their ability to regenerate energy to the d.c. bus 34 is reduced or eliminated and an excessive bus voltage is not developed. Under normal operating conditions this situation exists for very short time intervals and the effect on machine motion is minimal.

Referring again to FIG. 3B, the line 208 also connects through the inverting amplifier 253 and a resistor 270 to the inverting input of an operational amplifier 271. The inverting input of the operational amplifier 271 also connects to a positive reference signal source which includes potentiometer 272, and when the voltage on the d.c. bus 34 exceeds 120% of its nominal value (approximately 900 volts) the output of the amplifier 271 is driven to a logic high voltage level. This logic high voltage is inverted by an inverter gate 273 and it is coupled through a control line 274 to each of the inverter control circuits 38, 39 and 40.

Referring to the inverter control circuit diagram in FIGS. 6A and 6B, the control line 274 connects to each of the enable terminals 110R, 110S and 110T through respective diodes 275-277. As a result, when the d.c. bus voltage exceeds 120% of its nominal value the NAND gates 105 are disabled and the SCRs in the inverter circuits 35-37 are not fired. The motor drives are thus effectively disconnected from the d.c. bus 34 to protect the inverters 35-37 from the excessive voltage and the resulting currents. It should be noted, however, that this action results only after the above described methods of reducing bus voltage have failed. As will now be described, when this potentially destructive situation exists, the power monitor and control circuit 51 also operates the master control circuit 41 to open the main contacts 24 and shut down the machine.

Referring again to FIG. 3B, excessive bus voltage is sensed by an operational amplifier 280 which has its inverting input connected to the control line 208 through the inverting amplifier 253 and a resistor 281. Its inverting input is also connected through a resistor 282 to a positive reference signal source which includes a potentiometer 283. The output terminal of the operational amplifier 280 is connected to one input of a NOR gate 284 and to the input of an inverter gate 285. The output of the inverter gate 285 connects to the set input terminal on an RS flip-flop 286 and the output of the NOR gate 284 connects to the set input terminal of a second RS flip-flop 287.

When the d.c. bus voltage exceeds 120% of its nominal value, the output of the operational amplifier 280 is driven to a logic high voltage and the flip-flops 286 and 287 are set to generate logic high voltages at their respective Q outputs and logic low voltages at their respective Q̄ outputs. The Q output of the second RS flip-flop 287 is coupled through an inverter gate 288 to the control line 49 which drives the transistor 48 in the master control circuit 41. Thus, when the flip-flop 287 is set in response to the excessive bus voltage, a logic low disable signal is generated to the master control circuit 41 which causes the main contacts 24 to drop out. The mining machine is thus shut down.

Light emitting diodes 289 and 290 connect the respective Q̄ terminals on the flip-flops 286 and 287 to a positive d.c. supply terminal and these are energized when the flip-flops are set to indicate the status of the circuitry when maintenance personnel are called in to correct the problem. The reset terminals on the flip-flops 286 and 287 are connected through a reset line 291 to one side of a normally open reset pushbutton switch 292 and the other side of the switch 292 is connected to a negative d.c. supply terminal. When maintenance personnel have corrected any problems which may exist, the switch 292 is closed to reset the flip-flops 286 and 287.

The remaining portion of the power monitor and control circuit 51 is directly responsive to power outages which cause the voltage across the main a.c. power lines 20-22 to drop. Referring particularly to FIG. 3B, the analog signal on the line 195 which indicates the magnitude of the power line voltage is applied through a resistor 295 to the inverting input of an operational amplifier 296 which serves as a voltage comparator. A negative reference signal generated at a potentiometer 297 is also applied to the inverting input of the operational amplifier 296 and when it is less than the analog signal on the line 195, the output of the comparator amplifier 296 is coupled through a diode 298. The slider on the potentiometer 297 is adjusted such that when the line voltage drops below 70% of its nominal value (approximately 2900 volts) the reference signal exceeds the analog signal on the line 195 and the output of the operational amplifier 296 is driven to a logic high voltage.

This logic high signal is coupled through a gate 299 to the input of a 2.5 second timer circuit 300. It is also applied to one input of an AND gate 301 and to the input of an inverter gate 302. The output of the inverter gate 302 is connected to the set terminal of a third RS flip-flop 303 and the reset terminal on the flip-flop 303 is connected to the reset line 291. Its $\bar{Q}$ output terminal is connected through a light emitting diode 304 to a positive d.c. supply terminal and the light emitting diode 304 is thus energized when the flip-flop 303 is set and becomes illuminated to indicate that a power outage has occurred.

The mining machine is shut down if an indicated power outage lasts for more than 2.5 seconds. The logic high signal applied to the input of the 2.5 second timer 300 initiates the timer and when it times out, a logic high disable signal is generated at its output terminal 305 and is applied to a second input on the NOR gate 284. As a result, the RS flip-flop 287 is set to generate a logic high voltage at its Q output which is inverted by the gate 288 and applied to the power enable line 49. The line contacts 24 immediately drop out and the machine is shut down.

As described above, when a power outage occurs measures are taken immediately by the power monitor and control circuit 51 to maintain the d.c. bus voltage at a usable level. The result of such measures may be that all drive motors 12, 13 and 14 come to a halt before the machine is shut down by the 2.5 second timer 300. In other words, it may appear to the operator that the machine has shut down when in fact it hasn't. If line voltage is restored before the 2.5 second timer 300 times out, power will automatically be restored to one or more of the drive motors 12–14 and the system will "come back to life." Although this avoids the necessity of a complete shut down of the mining machine during momentary power outages, this situation presents a problem. Specifically, the system becomes nonresponsive to the operator's controls and may come to a halt long enough for the operator to abandon the controls thinking that the machine has shut down.

Referring again to FIG. 3B, to prevent this from occurring the output of the AND gate 301 is connected to the input of a one second timer circuit 307. A second input on the AND gate 301 is connected to receive a zero speed logic signal from an AND gate 308 that forms part of a speed sensing means. The three inputs of the AND gate 308 connect through a control cable 309 to circuits associated with each motor tachometer 75. These circuits include an operational amplifier 306 as shown in FIG. 6C, which has one input coupled to the speed feedback signal line 71 through an inverting amplifier 391 and a diode 392. When the motor speed drops to zero, the output of the operational amplifier 306 goes high, and when all three motors 12–14 come to a halt the AND gate 301 is enabled to generate a logic high zero speed signal. Thus when the line voltage drops below 70% of its nominal value as indicated by the operational amplifier 296 and all three drive motors 12–14 come to a halt, a logic high timer signal is generated by the AND gate 301 to the one second timer 307.

Referring again to FIG. 3B, when the one second timer 307 times out it generates a logic high voltage at its output terminal 310 which is inverted by a gate 311 and is applied to the set terminal of an RS flip-flop 312. The flip-flop 312 is set to generate a logic low at its $\bar{Q}$ output that energizes a light emitting diode 313 and it generates a logic high voltage at its Q output which is connected to the base of a switching transistor 314. The base and collector of the transistor 314 are connected through respective resistors 315 and 316 to a positive d.c. supply terminal and its emitter is connected to signal ground. The collector of the transistor 314 is also connected to a control line 317 through a coupled diode 318. When the transistor 314 is turned on by the logic high voltage at the Q output of the flip-flop 312, the control line 317 is pulled to a low voltage.

Referring particularly to FIG. 6A, the control line 317 connects to the input of the voltage control oscillator 86 in each inverter control circuit 38–40. The control line 317 thus holds the input of the VCO 86 low and the operator speed commands are overridden. The machine is thus inhibited from operation until the RS flip-flop 312 is reset by depressing the reset pushbutton 292.

I claim:

1. In a drive system for a mining machine having a hoist motor, a crowd motor and a swing motor, the combination comprising:
   a rectifier circuit having inputs connected through lines to a source of a.c. power and an output terminal at which d.c. power is produced;
   disconnect means connected to said lines and being operable in response to a disable signal applied to a power enable input to disconnect said rectifier circuit from said a.c. power source;
   a d.c. bus connected to said rectifier output terminal;
   a set of inverters, each having an input connected to said d.c. bus, each having an output connected to one of said motors and each being operable in response to signals from an associated inverter control circuit to deliver power to its attached motor from said d.c. bus and to regenerate power to said d.c. bus from its attached motor; and
   a power monitor and control circuit which includes:
   a. voltage sensing means coupled to said a.c. power source for generating an analog signal which is proportional to the voltage applied to the inputs of said rectifier circuit;
   b. comparator means connected to said voltage sensing means for generating a preselected logic signal when said analog signal drops below a predetermined level;
   c. timer means connected to said comparator means and being enabled by said preselected logic signal to generate said disable signal to said disconnect means power enable input when said preselected logic signal is present for a preselected time interval; and
   d. means connected to said d.c. bus for generating a reduction signal to each of said inverter control circuits which reduces the power delivered by said inverters to their attached motors when the voltage of said d.c. bus drops below a preselected level.

2. The drive system as recited in claim 1 in which speed sensing means are coupled to each of said motors and it operates to generate a zero speed logic signal when all of said motors are substantially stationary, and in which said power monitor and control circuit further includes:
   e. gate means having one input connected to receive the preselected logic signal generated by said comparator means and a second input connected to receive said zero speed logic signal, and in response to the presence of both of these signals, generating a timer logic signal; and
   f. second timer means connected to the output of said gate means and being operable to generate an inhibit signal to each of said inverter control circuits which prevents the delivery of power to said motors when said timer logic signal is generated for a preselected time interval.

3. The drive system as recited in claims 1 or 2 which includes a chopper circuit connected to said d.c. bus that is responsive to a chopper control signal applied to an input terminal to conduct power from said d.c. bus and dissipate it in an associated resistor, and in which said power monitor and control circuit further includes:

g. means connected to said d.c. bus for generating a chopper control signal to said chopper circuit input terminal which increases the power dissipated by said chopper circuit when the voltage of said d.c. bus increases above a preselected level.

4. The drive system as recited in claim 1 in which said power monitor and control circuit further includes:

h. means connected to said d.c. bus for generating a regeneration reduction signal to each of said inverter control circuits which reduces the power regenerated by said inverters to the d.c. bus when the voltage of said d.c. bus increases above a preselected level.

5. The drive system as recited in claim 1 in which said power monitor and control circuit further includes:

i. means connected to said d.c. bus for generating a disable signal to said disconnect means which disconnects said rectifier circuit from said a.c. power source when the voltage on said d.c. bus increases above a preselected level.

6. In a drive system for a mining machine having a set of motors which each connect to provide separate machine motions, the combination comprising:

a set of inverters, each inverter associated with one of said motors and each connected to deliver energy to its associated motor or to receive energy regenerated by its associated motor;

a d.c. bus connected to each of said inverters to deliver energy to them and to receive energy from them which is regenerated by their associated motors;

a rectifier circuit having an input connected to an a.c. power line and an output connected to said d.c. bus, said rectifier circuit being operable to deliver energy to said d.c. bus from said a.c. power line; and power monitor and control circuit means coupled to said d.c. bus and each of said inverters, said power monitor and control means being responsive to a drop in the energy delivered to the d.c. bus by said rectifier circuit to reduce the energy demanded by said inverters from said d.c. bus and to enable energy regenerated by any of said motors to be applied through its associated inverter to said d.c. bus, whereby energy generated by one or more machine motions is employed to maintain other machine motions which demand energy.

\* \* \* \* \*